United States Patent [19]
Moores, Jr.

[11] Patent Number: 5,940,977
[45] Date of Patent: Aug. 24, 1999

[54] RECIPROCATING SAW WITH AN ANGULAR BLADE DRIVE AND ROTATABLE BLADE HOLDER

[75] Inventor: Robert G. Moores, Jr., Reisterstown, Md.

[73] Assignee: Black & Decker Inc., Newark, Del.

[21] Appl. No.: 08/720,926

[22] Filed: Oct. 4, 1996

Related U.S. Application Data

[60] Provisional application No. 60/005,048, Oct. 10, 1995.

[51] Int. Cl.$^6$ .............................. B23D 49/04; B23D 19/00
[52] U.S. Cl. .................................. 30/392; 30/394; 30/519
[58] Field of Search ............................. 30/392, 393, 394, 30/519

[56] References Cited

U.S. PATENT DOCUMENTS

| | | |
|---|---|---|
| 1,406,071 | 2/1922 | Pavelka . |
| 2,337,769 | 12/1943 | Redenbo ................................... 30/394 |
| 2,436,692 | 2/1948 | Greene . |
| 2,619,132 | 11/1952 | Pierce ..................................... 30/394 |
| 2,783,790 | 3/1957 | Keesling ................................. 30/394 |
| 2,793,661 | 5/1957 | Olson . |
| 2,984,757 | 5/1961 | Papworth ................................ 30/393 |
| 3,580,342 | 5/1971 | Matthews . |
| 3,785,053 | 1/1974 | Michaelson ............................. 30/394 |
| 3,876,015 | 4/1975 | Kivela . |
| 4,137,632 | 2/1979 | Pfanzer ................................... 30/393 |
| 4,998,353 | 3/1991 | Fukuda et al. .......................... 30/393 |
| 5,079,844 | 1/1992 | Palm ....................................... 30/393 |
| 5,193,281 | 3/1993 | Kasten . |
| 5,598,636 | 2/1997 | Stolzer .................................... 30/393 |

FOREIGN PATENT DOCUMENTS

| | | |
|---|---|---|
| 0072282 | 2/1983 | European Pat. Off. . |
| 0125101 | 11/1983 | European Pat. Off. . |
| 0561473 | 9/1993 | European Pat. Off. . |
| 412773 | 4/1925 | Germany . |
| 803013 | 2/1951 | Germany . |
| 7442904 | 9/1975 | Germany . |
| 7904242 | 7/1980 | Germany . |
| 4103809 | 8/1991 | Germany . |
| 4116343 | 11/1992 | Germany . |
| 9205003 | 4/1992 | WIPO . |
| 9400264 | 1/1994 | WIPO . |

*Primary Examiner*—M. Rachuba
*Attorney, Agent, or Firm*—Dennis A. Dearing; John D. Del Ponti; Bruce S. Shapiro

[57] ABSTRACT

According to one aspect of the invention, a reciprocating saw 21, 154 comprises a housing 23, 154 pivotable about a first axis 29. A blade holder 49 is mounted for reciprocation along a second axis 53 perpendicular to the first axis. An angular blade drive train 61 is directly connected between a motor 43 and the blade holder. The angular blade drive permits the blade axis of reciprocation 55 to be adjusted in a plane parallel to the saw sidewalls 177. Drive train 61 consists solely of a rotary section 63 and a reciprocating section 65. The rotary section is connected directly between the motor and the reciprocating section. The reciprocating section is connected directly to the blade holder. According to a second aspect of the invention, a reciprocating saw 21,154 comprises a housing 23, a drive train 61, a blade holder 49, and a connector 59. Blade holder 49 is rotatably mounted in connector 59 for rotation about an axis 53 parallel to and spaced from an axis 55 of reciprocation of output bar 57.

7 Claims, 9 Drawing Sheets

RECIPROCATING SAW WITH AN ANGULAR BLADE DRIVE AND ROTATABLE BLADE HOLDER

CROSS-REFERENCE TO RELATED PATENT APPLICATION

This application is based upon and claims priority under 35 U.S.C. §119 and 37 C.F.R. §1.78 of copending U.S. Provisional Application Ser. No. 60/005,048, filed on Oct. 10, 1995.

BACKGROUND OF THE INVENTION

This invention relates to saws and more particularly relates to a reciprocating saws that are used typically for rough cutting applications.

Reciprocating saws are used by variety of tradesmen such as plumbers, electricians and carpenters for both remodeling and new construction. Many of the applications require the saw to be used in confined locations that restrict the maneuverability of the saw. Conventionally such saws have an elongated, integral housing and have the blade fixed for reciprocation in a single plane. In U.S. Pat. No. 5,193,281 and PCT application WO94/00264, it has been suggested that greater versatility can be added by providing an attachment with an angular blade drive for the saw. As used herein, "angular blade drive" means a drive that would permit the blade axis of reciprocation to be adjusted in a plane parallel to the sidewalls of the saw(i.e, to be pivoted about an axis perpendicular to the longitudinal axis of the saw housing). The disclosed blade drives all comprise various drive mechanisms for converting the normal reciprocating output of the saw to rotary and then back to reciprocating. The PCT application also suggests that the blade drive may be integrated into the main body of the saw. In the latter case the main body of the housing is pivotable to permit the blade axis to be varied. Both publications also disclose blade holders that are adjustable so that the blade may be rotated about its axis of reciprocation to increase its ease of use.

The saws disclosed in both publications still fail achieve the desired level of compactness, durability, balance and simplicity.

SUMMARY OF THE INVENTION

The present invention has two primary aspects. The first aspect is directed to a saw with an angular blade drive and a pivotable housing permitted the saw to be more easily used and maneuvered in a wider variety of applications. According this aspect, a saw comprises housing with a first section and a second section pivotally attached to the first section for rotation about a first axis. The first section contains a motor with a rotary output shaft. A blade holder is mounted for reciprocation along a second axis perpendicular to the first axis. An angular blade drive train is directly connected between the motor output shaft and the blade holder. The drive train consists solely of a rotary section and a reciprocating section. The output of the motor is connected directly to the input of the rotary section. The output of the rotary section is directly connected to the input of the reciprocating section. The output of the reciprocating is directly connected blade holder.

Through such a drive train the rotary motor output is converted to reciprocating motion solely one time.

The drive train may comprise a bevel gear and scotch yoke drive, a spur gear and scotch yoke drive, or a crank and connecting rod drive.

The reciprocating section of the drive train preferably comprises a saw bar mounted for reciprocating motion in the second or bar section of the housing.

The pivotable connection between the first or motor housing section and the bar housing section preferably comprises a front portion of the motor section and a rear portion of the bar housing section overlapping the motor housing section.

The second aspect of the invention is directed to saw with a blade holder that is rotatable about the axis the of blade reciprocation. Such a saw is again easier to use and more maneuverable in a wide variety of applications. The first and second aspects may be used together or independently in a saw. According to the second aspect, a saw comprises a housing and a motor disposed in the housing and having a rotary output shaft. A drive train is connected to the motor output shaft and converts rotary to reciprocating motion. The drive train mechanism has an output bar mounted in the housing for reciprocation along a first axis. A blade holder is provided for mounting a blade for reciprocation along a second axis parallel to and spaced from the first axis. A rigid connector is connected to the bar and mounts the blade holder for rotation about the second axis. The connector transmits in phase the reciprocating motion of the bar to the blade holder.

The housing preferably comprises a first section and a second section pivotably connected to the first section for pivoting about a third axis perpendicular to the first axis.

The drive train may comprise any of the drive trains usable with the first aspect of the invention and may also use conventional drive trains for converting rotary to reciprocating motion such as a wobble plate drive.

A latch is preferably mounted on the connector and is engageable and disengageable with the blade holder to respectively lock and unlock the blade holder against rotation about the third axis.

BRIEF DESCRIPTION OF THE DRAWINGS

The accompanying drawings which are incorporated in, and constitute a part of, this specification illustrate in schematic form three embodiments of the invention and together with the description serve to explain the principles of the invention. In the drawings, the same reference numerals indicate the same parts.

FIG. 8 is a fragmentary cross-sectional view of a second embodiment of a reciprocating saw in accordance with the present invention incorporating a crank and connecting rod drive train. In FIG. 8, the view is taken along line 8—8 of FIG. 9 delineating a plane extending from the top to the bottom of the saw.

DESCRIPTION OF THE PREFERRED EMBODIMENT

The preferred embodiment of a saw according to the present invention is illustrated in FIGS. 1–7 and 12–16. Alternative embodiments of a drive train for a saw of the present invention are illustrated, respectively, in FIGS. 8 and 9 and FIGS. 10 and 11.

Figure 1:
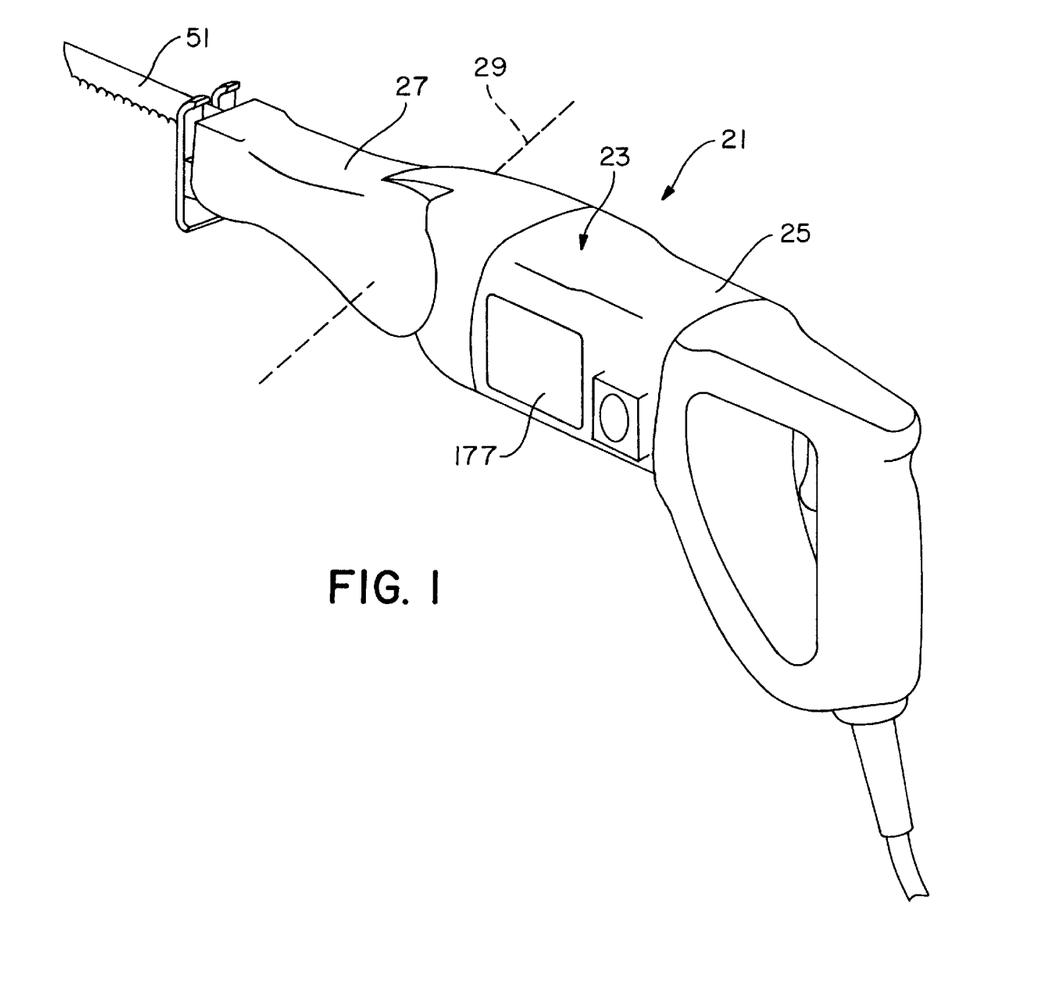
FIG. 1 is a perspective view of a reciprocating saw in accordance with the present invention.
Figures 2, 3:
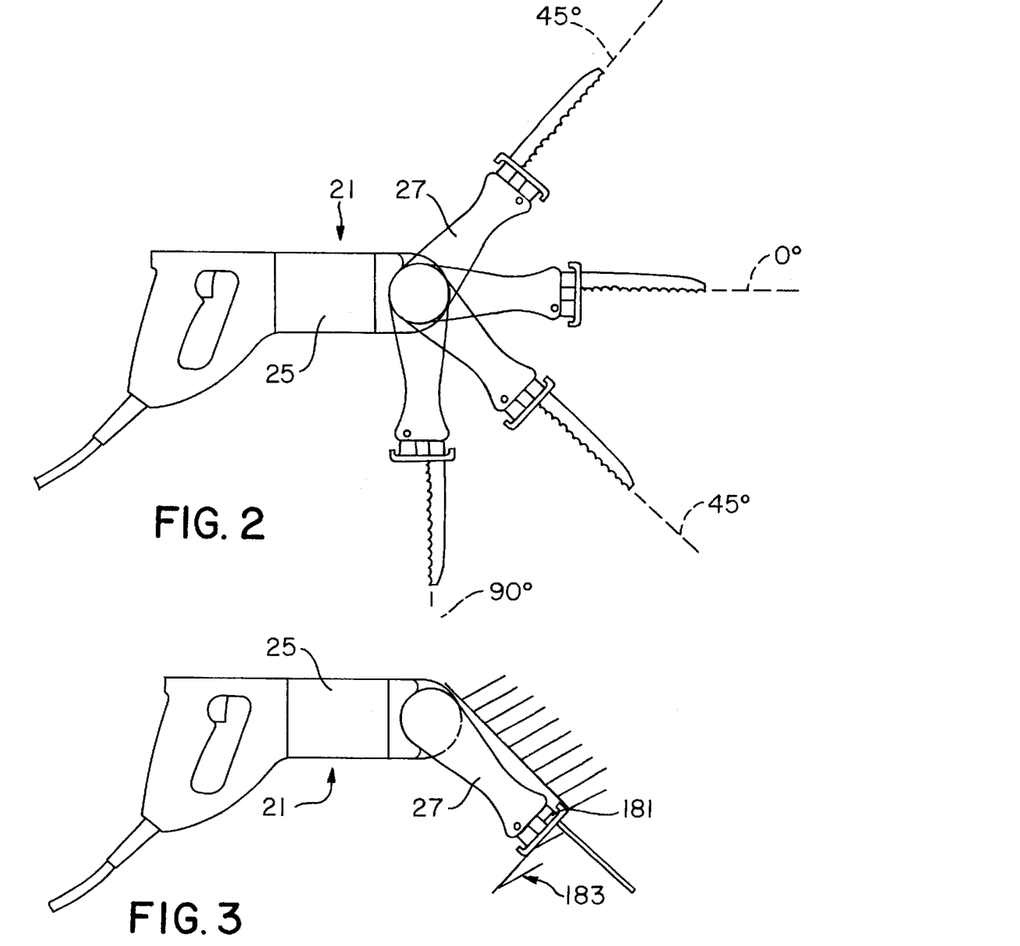
FIG. 2 is a side elevational view of the saw shown in FIG. 1 illustrating that the saw housing is angularly adjustable.
FIG. 3 shows a side elevational view of the saw of FIG. 1 and illustrates an application for the saw when the blade is oriented to reciprocate in a plane perpendicular to the side walls of the saw.
Figure 5:
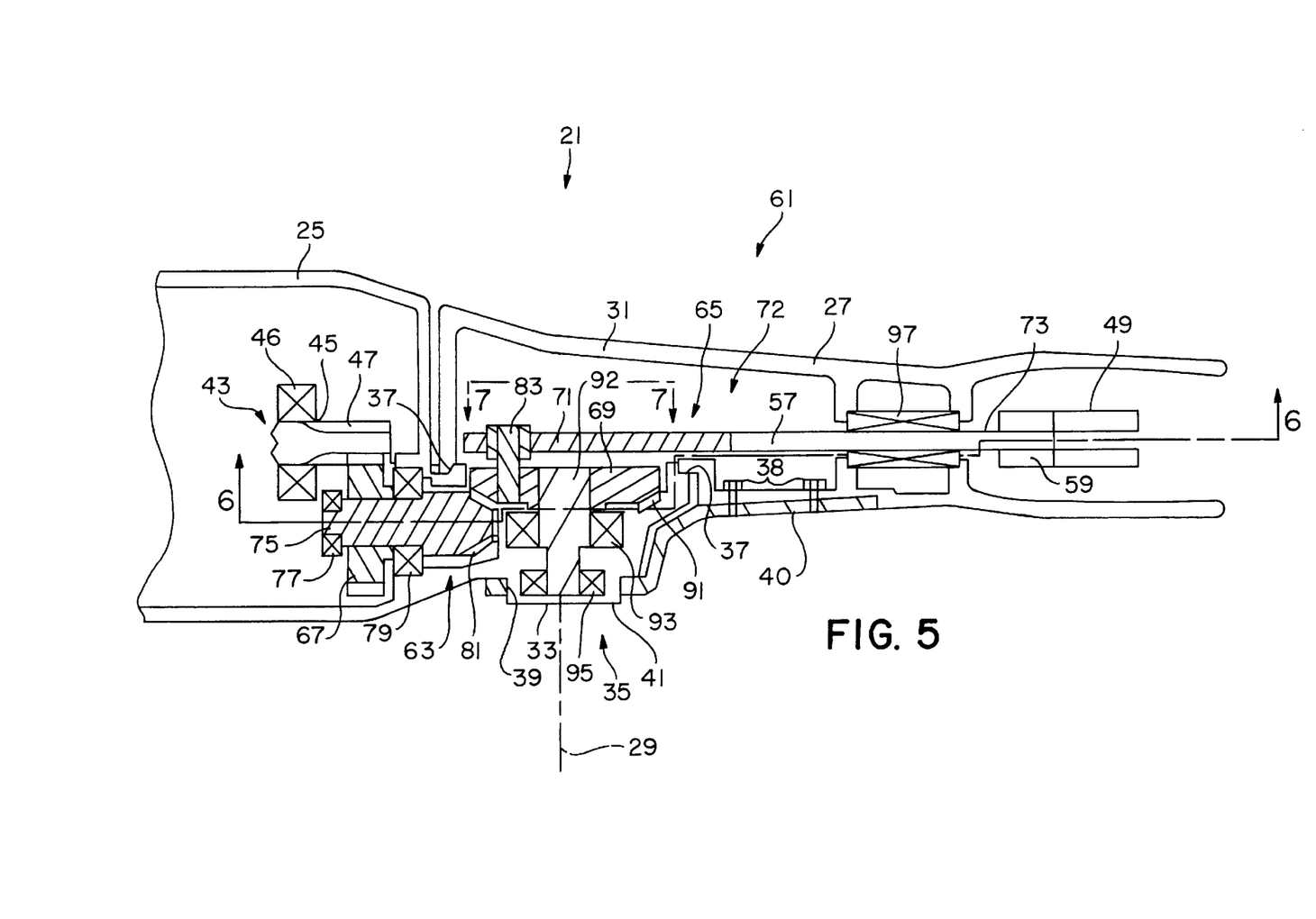
FIG. 5 is a fragmentary cross-sectional top view of the bottom half of the saw shown in FIG. 1 according to a first embodiment of the present invention incorporating a bevel gear and scotch yoke drive train.

The preferred embodiment is a reciprocating saw 21 that may be typically used by carpenters, plumbers and electricians for rough sawing applications. The first aspect of the invention relates to a saw with an angular blade drive and a pivotable housing. As shown in FIG. 1, saw 21 comprises a housing 23 including a first or motor section 25 and second or bar section 27 pivotally connected to the first section for rotation about a first axis 29 to permit housing 25 to be selectively adjusted into a plurality of angular configurations. As shown in FIG. 2, preferably front section 27 may be selectively adjusted through an angular range of 135°. If the inline position of the housing is chosen as 0°, front section 27 may be pivoted between approximately –45° and 90°. Preferably, as shown in FIG. 5, bar housing 27 has a rear portion 31 overlapping a front portion 33 of motor housing 25. Portions 31, 33 are pivotally connected at a joint 35 formed by sandwiching front portion 33 between an annular bearing surface 37 of rear portion 31 and a plate 40 rigidly attached to bar housing 27 by screws 38. Plate 40 has a circular opening 39 surrounding a cylindrical projecting hub 41 of front portion 33.

Although not depicted, housing 23 would preferably include a latch for locking the location of bar section 27 relative to motor section 25. Such a latch would be released to permit adjustment of housing section 27 and then relatched to securely lock section 27 into its adjusted position.

According to the invention, saw 21 further comprises a motor 43 located in the first or motor section and having a rotary output shaft 45 supported in a bearing 46. Motor is preferably a universal motor but other types may be used. Preferably, motor shaft 45 has a integrally formed pinion 47 at its distal end.

According to the invention, saw 21 further comprises a blade holder 49 for mounting a blade 51 for reciprocation along a second axis 53 perpendicular to the first pivot axis 29. As will be explained in accordance with the second aspect of the present invention, blade holder 49 is offset from the axis of reciprocation of an output saw bar 57 by connection of holder 49 to bar 57 through a rigid connector 59. The purpose for offsetting blade axis 53 and bar axis 55 and the function of connector 59 will be explained in detail below in connection with FIGS. 12–16.

According to the invention, saw 21 further comprises an angular blade drive train 61 (FIGS. 5–11) directly connected between motor output shaft 45 and blade holder 49 for reciprocally driving holder 49 reciprocally along axis 53. Drive train 61 consists of a solely rotary section 63 and a solely reciprocating section 65. Rotary section 63 has an input 67 directly connected to motor output shaft 45. An output 69 of rotary section 63 is directly connected to an input 71 of reciprocating section 65. An output 73 of reciprocating section 65 is directly connected to blade holder 49. Drive train 61 may also constitute a drive train means for converting the rotary motor output to a reciprocating drive input 71 to saw bar 57 by converting rotary to reciprocating movement solely one time. As will be appreciated, the present invention provides significant advantages compared to prior art saws discussed above that convert rotary to reciprocating motion twice. Preferably drive train 61 may be constituted by a bevel gear and scotch yoke drive train 72 depicted in FIGS. 5–7. Alternatively, drive train 61 may be constituted by a crank and connecting rod drive train 74 in accordance with a second embodiment of the invention depicted in FIGS. 8 and 9 or a spur gear and scotch yoke drive train 76 in accordance with a third embodiment of the present invention depicted in FIGS. 10 and 11.

Figure 6:
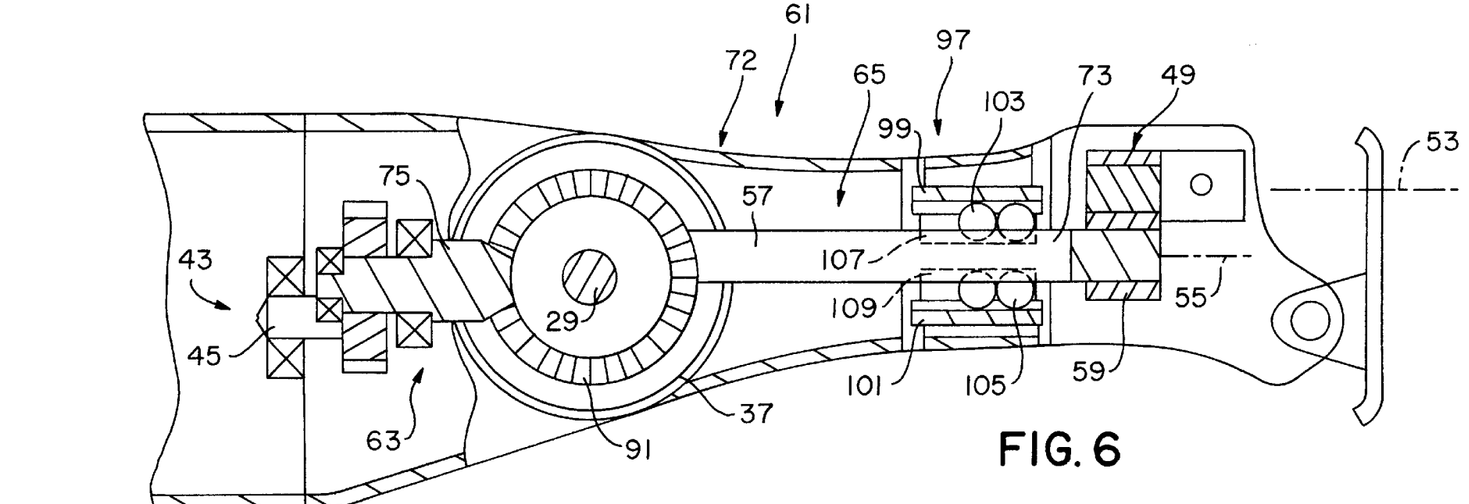
FIG. 6 is a cross-sectional side view of the saw of FIG. 1 taken generally along line 6—6 of FIG. 5.
Figure 7:
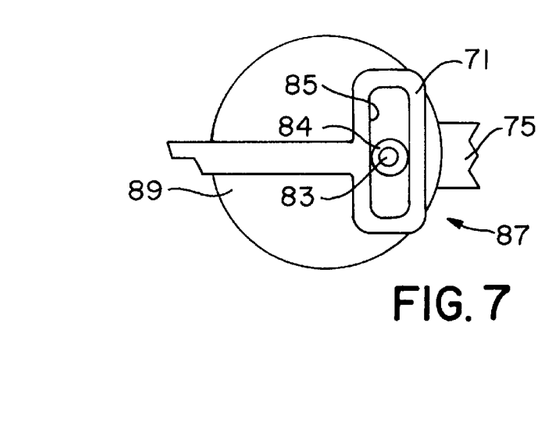
FIG. 7 is a fragmentary side elevational view taken along line 7—7 of FIG. 5.

As shown in FIGS. 5–7, the bevel gear and scotch yoke drive preferably comprises an input spur gear 67 fixed at one end of a shaft 75 rotatably supported in bearings 77, 79. Shaft 75 has a pinion 81 that is formed opposite spur gear 67 and drives an output bevel gear 69. Gear 69 drives input 71 of the reciprocating section 65 through a cam shaft 83, bearing 84, and cam follower 85 of the scotch yoke 87. Cam shaft 83 extends from a rear face 89 of output bevel gear 69 parallel to the axis of rotation 29 of the housing sections 25, 27. Bevel gear 69 is fixed to a support shaft rotatably supported in spaced bearings 93, 95 for rotation about axis 29 which is also the axis for pivotal movement of bar housing 27 relative to motor section 25.

Drive train 61 further comprises output bar 57 integrally formed with scotch yoke 87 and connector 59 fixed to the distal end of bar 57. Bar 57 is constrained for linear reciprocation in bearing 97. Bearing 97 comprises a pair of spaced guides 99, 101, spaced pairs of ball bearings 103, 105 supported, respectively, in channels 107, 109 in bar 57.

In operation of the bevel gear and scotch yoke drive of FIGS. 5–7, the rotary output from motor 43 is transmitted to shaft 75 through pinion 47 and input spur gear 67. Rotation of shaft 75 is transmitted to output bevel gear 69 through pinion 81 drivingly engaged with bevel gear teeth 91. Rotation of bevel gear 69 is transmitted and converted to a reciprocating drive input to saw bar 57 through scotch yoke 87, cam shaft 83 and cam follower 85. As output bevel gear 69 is rotated, cam shaft 83 moves in a circular path about axis 29 and reciprocally drives bar 57. As bar 57 is reciprocally driven, bearing pairs 103, 105 roll reciprocally back and forth in channels 107, 109.

Figure 8:
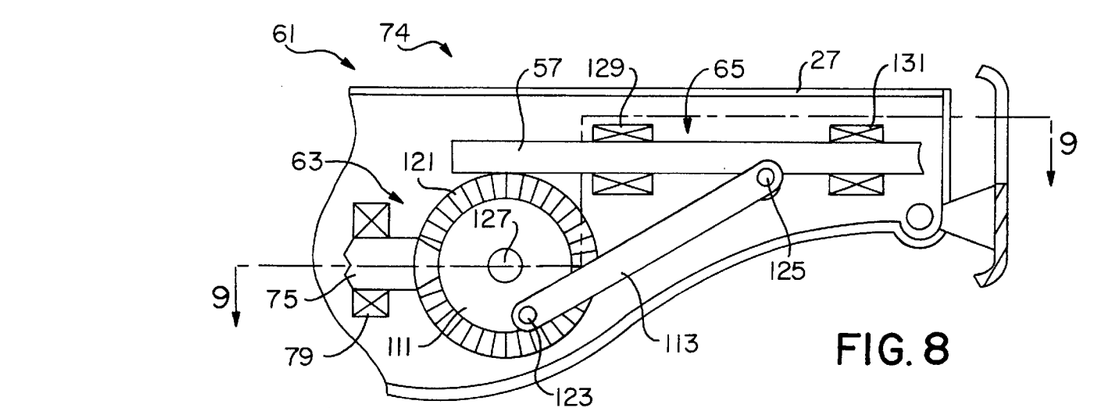
Figure 9:
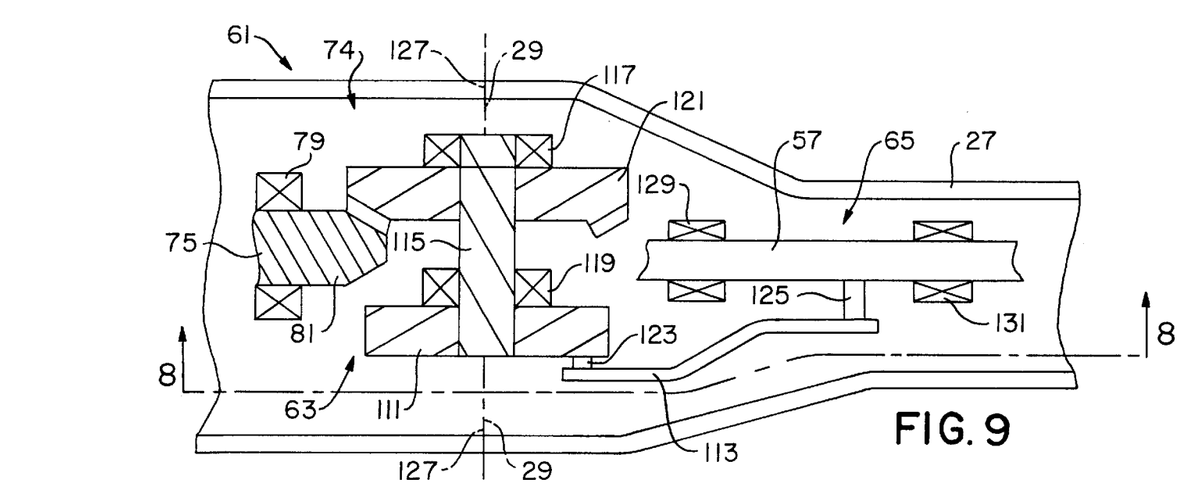
FIG. 9 is a fragmentary cross-sectional view of the saw taken along line 8—8 of FIG. 8.

As shown in FIGS. 8 and 9, when drive train 61 is constituted by the crank and connecting rod drive, drive train 61 is identical to the bevel gear and scotch yoke drive train shown in FIGS. 5–7 except that rotary shaft 75 serves as an input to a crank disc 111 for driving crank rod 113 thereby converting rotation of crank disc 111 into reciprocating movement of output saw bar 57. Crank disc 111 is supported on a shaft 115 rotatably supported in bearings 117, 119. Shaft 115 is rotatable about an axis 127 that is preferably coaxial with housing pivot axis 29. However, if desired, axes 29 and 127 can be parallel and offset. Shaft 115 is driven by shaft 75 through a bevel gear 121 fixed to shaft 115. Crank rod 113 is pivotally connected to disc 111 by pin 123 and pivotally connected to bar 57 by a pin 125. Bar 57 is supported in a pair of bearings 129, 131 that are preferably identical to bearing 97 in FIG. 6.

In operation of the crank and connecting rod drive 74 of FIGS. 8 and 9, rotary output from motor 45 is transmitted through shaft 75, pinion 81 to bevel gear 121 fixed to shaft 115. Crank disc 111 (fixed to shaft 115) provides a rotary output (from rotary section 63) to crank arm 113 that serves as an input to reciprocating section 65.

Figure 10:
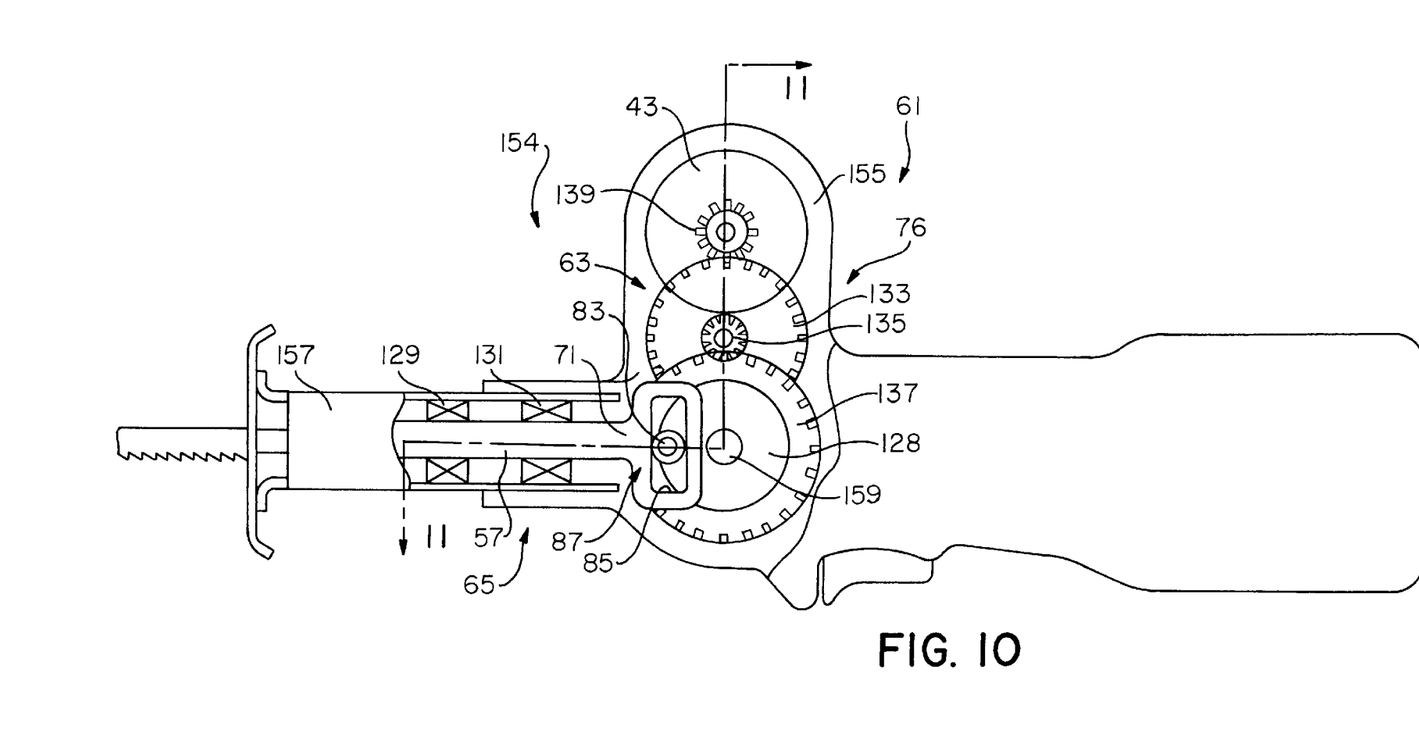
FIG. 10 is a schematic partially cross-sectional side view of a third embodiment of the present invention using a spur gear and scotch yoke drive train.
Figure 11:
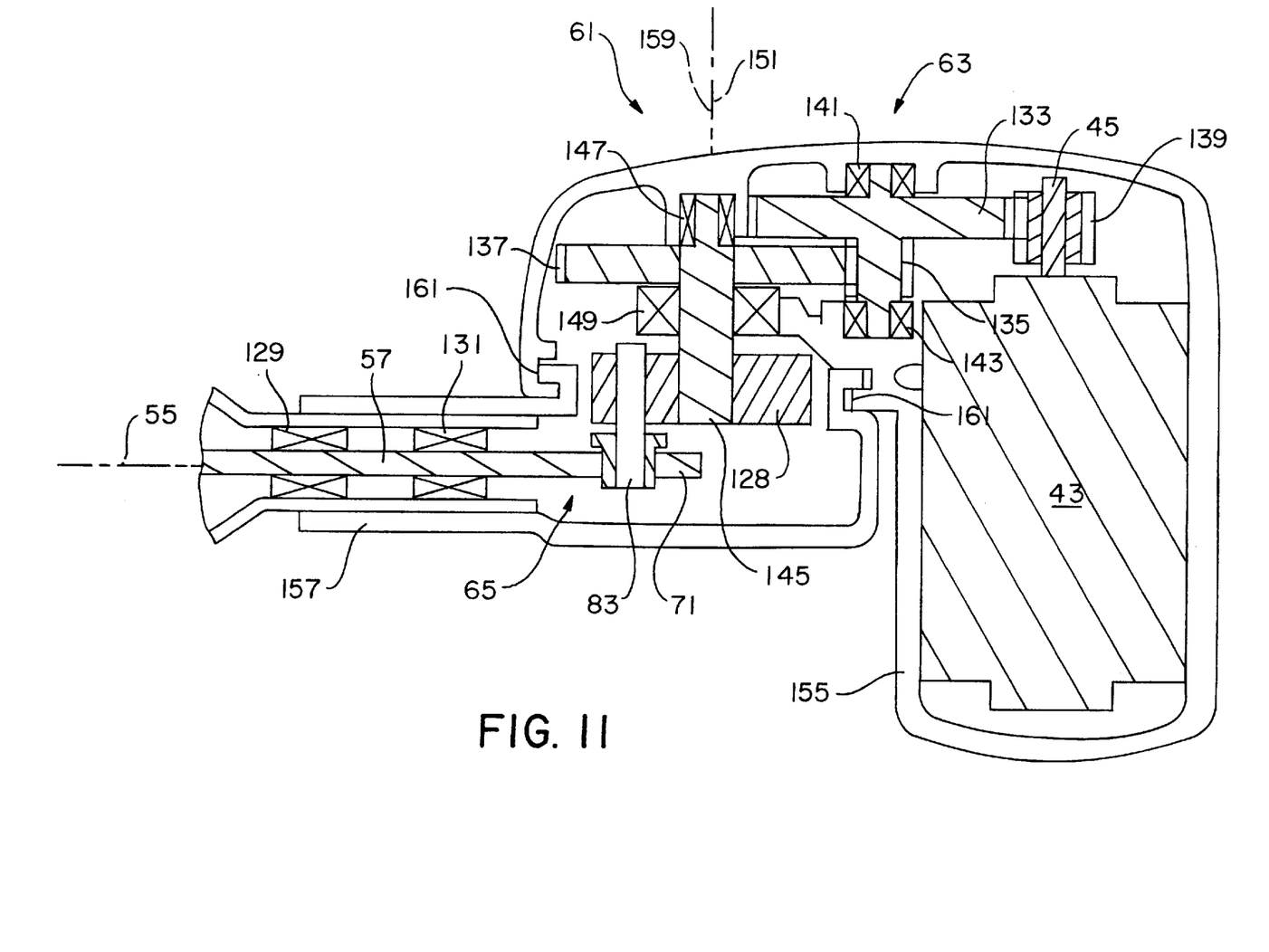
FIG. 11 is a fragmentary cross-sectional view taken along line 11—11 of FIG. 10.

As shown in FIGS. 10 and 11 when drive train 61 is constituted by the spur gear and scotch yoke drive 76, drive train 61 comprises a rotary section 63 constituted solely by spur gears and a reciprocating section 65 constituted by a scotch yoke, cam shaft and cam follower assembly identical to the first embodiment shown in FIGS. 5–7 except that cam shaft 83 is fixed for rotation in a disc 128 rather than an output bevel gear 69 in FIG. 5. Also, saw bar 57 is supported for linear reciprocating movement in a pair of bearings 129, 131 identical to bearing 97 in FIG. 5 rather than a single bearing 97 as used in the first embodiment.

Figure 12:
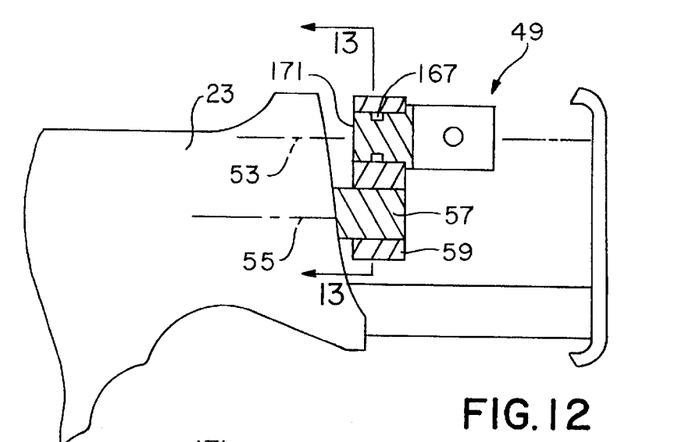
FIG. 12 is a fragmentary partially cross-sectional view of the front end of the saw of FIG. 1.

Rotary section 63 of drive train 61 in the third embodiment shown in FIGS. 11 and 12 is constituted by three spur gears 133, 135, 137 for transmitting the rotary output from motor output shaft 45 and spur gear pinion 139 to disc 128. Spur gears 133, 135 are integrally formed and are supported in a pair of bearings 141, 143. Spur gear 137 and disc 128 are fixed to and supported on a shaft 145 rotatably supported in bearings 147, 149 for rotation about an axis 151.

Because of the different configuration of drive train 76 and the orientation of motor 43, transverse to saw bar 57, the configuration of saw housing 152 for the third embodiment of a saw 154 according to the present invention is different from housing 23 for saw 21. Housing 152 has a motor section 155 and a bar section 157 pivotally connected to bar section 157 for rotation about an axis 159.

Housing sections 155, 157 are pivotally connected through a tongue and groove joint 155. Axes 151 and 153 are coaxial and as in the case of housing 23, bar section may be pivoted through a range of angles extending approximately between −45° and 90° (when an inline orientation is chosen as 0°).

In operation of spur gear and scotch yoke drive 76 (FIGS. 10, 11), the rotary drive output of motor 43 is converted to a reciprocating drive input to saw bar 57 through spur gears 133, 135, 137 and disc 128 which together constitute a rotary section of drive train 61 having an input spur gear 133 and an output disc 128. Disc 128 provides a rotary output to the input 71 of reciprocating section 65 through cam shaft 83 and cam follower 85 of scotch yoke 87. Saw bar 57 is integrally formed with scotch yoke 87 and is thus linearly reciprocally driven back and forth along axis 55.

A second aspect of the present invention illustrated in FIGS. 3, 4 and 12–16 permits saw 21 to be usable in a greater variety of applications. This is accomplished by mounting blade holder 49 for rotation about its axis of reciprocation. According to this aspect of the invention, a reciprocating saw 21 comprises housing 23, which in its broadest application need not be pivoted; a drive train 61, which in its broadest application need not be angularly adjustable; blade holder 49 and connector 59. Drive train 61 may take the forms shown in FIGS. 5–11, namely, a beveled gear and scotch yoke drive 72, a crank and connecting rod drive 74 and a spur gear and scotch yoke drive 76. Alternatively, conventional nonangular drive trains for converting rotary motion to reciprocating motion such as a wobble plate drive may be used in lieu of drive train 61.

According to this aspect of the present invention, blade holder 49 mounts a blade 51 for reciprocation along axis 53 parallel to and spaced from axis 55. Rigid connector 59 is fixed to bar 57 and mounts blade holder 49 for rotation about axis 53. Connector 49 transmits in phase the reciprocating motion of bar 57 to blade holder 49.

Figure 13:
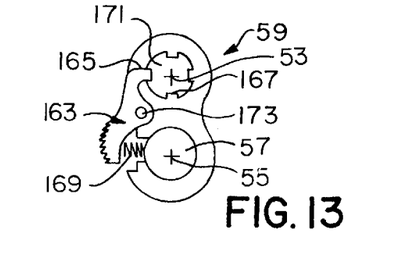
FIG. 13 is a cross-sectional view taken along line 13—13 of FIG. 12.
Figure 14:
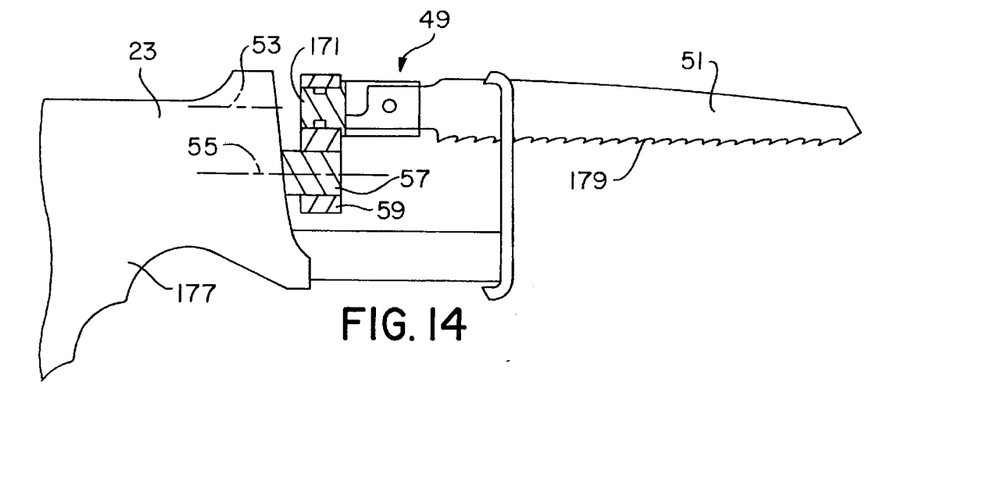
FIG. 14 is a fragmentary view similar to FIG. 12 except that a blade is mounted in the blade holder to illustrate one orientation of the blade. In this orientation, the blade is oriented parallel to the saw housing side walls with the saw teeth facing downwardly.
Figure 15:
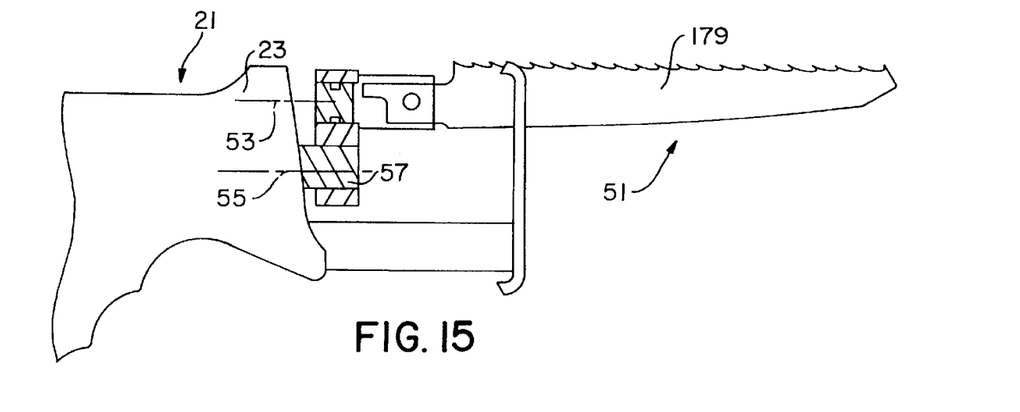
FIG. 15 is a fragmentary view similar to FIG. 14 except that a second orientation of the blade is illustrated. In this orientation, the blade is oriented parallel to the saw housing sidewalls with the saw teeth facing upwardly.
Figure 16:
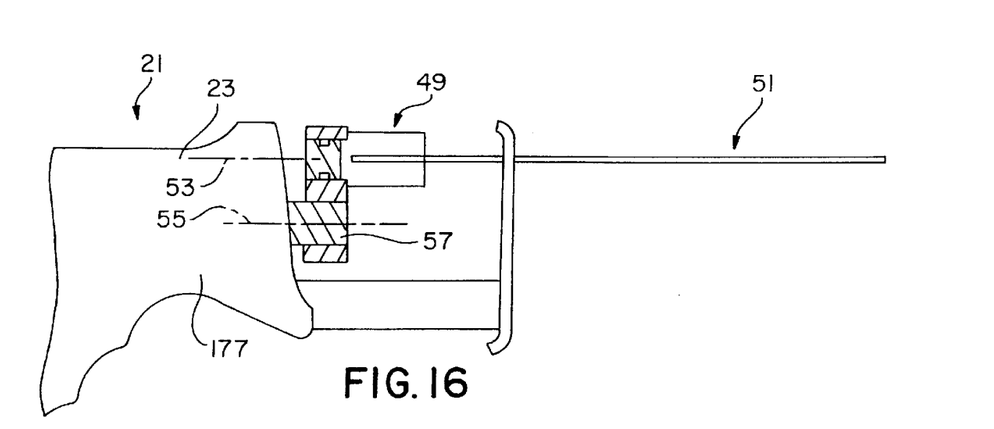
FIG. 16 is a fragmentary schematic view similar to FIGS. 14 and 15 except that a third orientation of the blade is illustrated. In this orientation, the blade is oriented perpendicular to the saw housing sidewalls with the saw teeth facing to the left of the tool.

Preferably, as shown in FIG. 13, blade holder 49 has a latch 163 with a tongue 165 that is selectively engageable in one of a plurality of pockets 167 formed at 90° intervals around the periphery of a shank 171 of holder 49. Latch 163 is pivotally connected to connector 59 by a pin 173 and is spring biased into a latched position by a coiled spring 175. When latch 163 is pivoted counterclockwise about pin 173, tongue 165 is pivoted out of pocket 161, and holder 49 can be selectively rotated manually about axis 53 for positioning of blade 51 at 90° intervals. Thus, as shown in FIG. 14, blade 51 may be located in a plane parallel to housing sidewall 177 with blade teeth 179 facing downwardly. As shown in FIG. 15, blade 51 may be located in a plane parallel to housing sidewall 177 with blade teeth 179 facing upwardly. And, as shown in FIG. 16, blade 51 may be located in a plane transverse to housing sidewalls 177 with the teeth 179 facing to the left of tool 21 (i.e., facing toward the plane of the page in FIG. 16). Alternatively, blade 51 may be located in a plane transverse to the sidewall 177 with the teeth 179 facing to the right of tool 23 (i.e., with the teeth facing outwardly of the plane of the page of FIG. 16).

Figure 4:
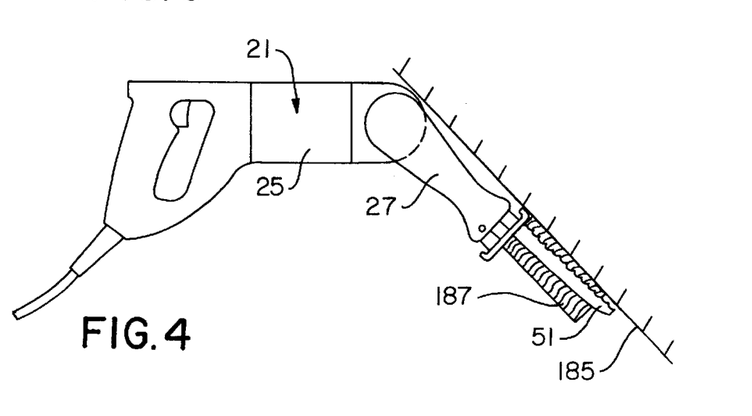
FIG. 4 shows a side elevational view of the saw of FIG. 1 and illustrates an application for the saw when the blade is oriented with the saw teeth projecting upwardly.

FIGS. 3 and 4 illustrate two applications for which saws 21,154 with a rotatable blade holder are particularly suited. In FIG. 3, with the blade oriented as shown in FIG. 16, blade 51 may be used to cut closely adjacent to an inside corner 181 of a right angular workpiece 183. In FIG. 4 with the blade oriented as shown in FIG. 15, blade 53 may be used to cut an overhead workpiece 185 attached to a planar work surface 187.

Those skilled in the art will recognize that the present invention offers a number of advantages. First, by integrating the angular blade drive into the basic drive train of the saw, the overall length of the saw is no longer than conventional reciprocating saws. The balance of the drive train is maintained when the saw housing is adjusted through the range of angles. And, an angular blade drive is achieved by converting rotary to reciprocating motion solely one time compared to prior art systems that require conversion of rotary to reciprocating motion twice. Secondly, the saw has improved versatility and maneuverability particularly when working in confined locations. Thirdly, when the rotatable blade holder is used with the angular blade drive even greater versatility and maneuverability is achieved without sacrificing compactness.

It will be apparent to those skilled in the art that various modifications and variations can be made in a saw according to the present invention without departing from the scope or spirit of the invention. Thus, it is intended that the present invention cover these modifications and variations provided they come within the scope of the appendant claims and their equivalents.

I claim:

1. A reciprocating saw comprising:

a housing;

a motor in the housing and having a rotary output shaft;

a drive train connected to the motor output shaft and for converting rotary to reciprocating motion;

the drive train having an output bar mounted in the housing for reciprocation along a first axis;

a blade holder for mounting a blade for reciprocation along a second axis parallel to and spaced from the first axis;

a rigid connector, connected to the bar and mounting the blade holder to permit selective rotation of the blade holder about the second axis; and the connector transmitting in phase the reciprocating motion of the bar to the blade holder.

2. The saw of claim 1 wherein:

the housing comprises a first section and a second section pivotably connected to the first section for pivoting about a third axis perpendicular to the first axis.

3. The reciprocating saw of claim 2 wherein:

the drive train is directly connected between the motor output shaft and the blade holder and reciprocally drives the blade holder; and the drive train consists of (a) a solely rotary section having an input and an output, the input directly connected to the motor output shaft and (b) a solely reciprocating section having an input and an output, the reciprocating section input directly connected to the rotary section output and the reciprocating section output directly connected to the blade holder.

4. The saw of claim 3 wherein:

the drive train is selected from the group consisting of a crank and connecting rod drive, a bevel gear and scotch yoke drive, and a spur gear and scotch yoke drive.

5. The saw of claim 3 wherein:

the drive train comprises a scotch yoke drive including a pinion shaft connected to the motor output shaft, a bevel gear connected to the pinion shaft and an output bar connected to and reciprocally driven by the bevel gear.

6. The saw mechanism of claim 3 wherein:

the drive train comprises a crank and connecting rod drive including a pinion shaft connected to the motor output shaft, a bevel gear connected to the pinion shaft, a crank connected to the beveled gear and a connecting rod connected to and reciprocally driven by the bevel gear.

7. The saw of claim 3 wherein:

the drive train comprises a spur gear and scotch yoke drive including a first spur gear connected to the motor output shaft, a second spur gear connected to the first spur gear and a saw bar connected to and reciprocally driven by the second spur gear.

* * * * *